US012244481B2

(12) United States Patent
van Rotterdam et al.

(10) Patent No.: US 12,244,481 B2
(45) Date of Patent: Mar. 4, 2025

(54) ACTIVITY STREAM BASED COLLABORATION

(71) Applicant: Open Text Corporation, Waterloo (CA)

(72) Inventors: Jeroen Mattijs van Rotterdam, Fort Lauderdale, FL (US); Gary Frankel, Nevada City, FL (US)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

(21) Appl. No.: 18/185,623

(22) Filed: Mar. 17, 2023

(65) Prior Publication Data

US 2023/0216770 A1    Jul. 6, 2023

Related U.S. Application Data

(63) Continuation of application No. 17/574,934, filed on Jan. 13, 2022, now Pat. No. 11,641,317, which is a
(Continued)

(51) Int. Cl.
*H04L 43/0888*  (2022.01)
*H04L 67/02*  (2022.01)
*H04L 67/125*  (2022.01)

(52) U.S. Cl.
CPC .......... *H04L 43/0888* (2013.01); *H04L 67/02* (2013.01); *H04L 67/125* (2013.01)

(58) Field of Classification Search
CPC ..... H04L 67/04; H04L 67/12; H04L 67/1097; H04L 9/3247; H04L 2209/805; H04L 63/0823; H04L 63/12; H04L 9/321; H04L 12/2856; H04L 65/1069; H04L 65/403; H04L 67/10; H04L 67/104; H04L 12/14; H04L 41/509; H04L 63/0428; H04L 63/126; H04L 67/61; H04L 9/00; H04L 9/32; H04L 12/1425; H04L 12/1818; H04L 12/1822; H04L 12/1827; H04L 12/1831; H04L 12/2859; H04L 12/2861; H04L 2101/30; H04L 2101/365; H04L 2101/663;
(Continued)

(56) References Cited

U.S. PATENT DOCUMENTS 8,938,500 B1 *   1/2015  Acharya ................ G06Q 50/01
                                                          709/204
11,416,824 B2   8/2022  Van Rotterdam et al.
(Continued)

OTHER PUBLICATIONS

Office Action for U.S. Appl. No. 17/863,617, mailed Jul. 14, 2023, 13 pages.
(Continued)

*Primary Examiner* — Djenane M Bayard
(74) *Attorney, Agent, or Firm* — Sprinkle IP Law Group

(57) ABSTRACT

An activity stream based interaction model is disclosed. To cause a desired application level action to be performed at a remote system, such as automatically retrieving and displaying a document in a viewer or other portion of a user interface at the remote system, a text-based tag, such as a hash tag, is inserted into an activity stream. The activity stream is sent to the remote system, which is configured to respond to the text-based tag by performing, at least in part automatically, the corresponding application level action.

20 Claims, 8 Drawing Sheets

Related U.S. Application Data continuation of application No. 16/572,285, filed on Sep. 16, 2019, now Pat. No. 11,252,069, which is a continuation of application No. 15/913,587, filed on Mar. 6, 2018, now Pat. No. 10,447,568, which is a continuation of application No. 15/610,019, filed on May 31, 2017, now Pat. No. 9,935,860, which is a continuation of application No. 13/529,286, filed on Jun. 21, 2012, now Pat. No. 9,692,675.

(58) Field of Classification Search
CPC ..... H04L 41/5077; H04L 61/00; H04L 61/30; H04L 63/123; H04L 63/1416; H04L 63/1425; H04L 65/1089; H04L 65/1093; H04L 65/4015; H04L 67/53; H04L 12/1482; H04L 12/2876; H04L 41/0213; H04L 41/0896; H04L 41/5003; H04L 41/5022; H04L 47/10; H04L 47/2408; H04L 47/31; H04L 51/18; H04L 51/52; H04L 63/105; H04L 67/1085; H04L 67/34; H04L 67/1095; H04L 67/568; G06F 3/04842; G06F 3/0482; G06F 16/951; G06F 3/04883; G06F 9/451; G06F 3/0481; G06F 40/169; G06F 9/54; G06F 16/9535; G06F 3/0488; G06F 3/1204; G06F 3/167; G06F 40/274; G06F 8/71; G06F 8/65; G06F 3/04817; G06F 3/0484; G06F 40/279; G06F 3/017; G06F 40/166; G06F 3/0485; G06F 3/04886; G06F 3/1205; G06F 3/1454; G06F 16/3322; G06F 16/3344; G06F 16/9537; G06F 3/0346; G06F 3/1288; G06F 9/542; G06F 11/302; G06F 11/3414; G06F 11/3612; G06F 11/3684; G06F 11/3696; G06F 2201/865; G06F 8/60; G06F 9/44505; G06F 16/252; G06F 16/957; G06F 8/63

See application file for complete search history.

(56) References Cited

U.S. PATENT DOCUMENTS

| | | | |
|---|---|---|---|
| 12,131,294 | B2 | 10/2024 | Van Rotterdam |
| 2005/0005258 | A1* | 1/2005 | Bhogal .................. G06F 8/73 |
| | | | 717/102 |
| 2005/0021652 | A1* | 1/2005 | McCormack ........... H04L 51/04 |
| | | | 709/204 |
| 2006/0161836 | A1* | 7/2006 | Thomson ................ G06F 9/454 |
| | | | 715/225 |
| 2007/0174247 | A1* | 7/2007 | Xu ....................... G06F 40/169 |
| 2012/0110087 | A1* | 5/2012 | Culver ................ G06Q 10/067 |
| | | | 709/205 |
| 2022/0351144 | A1 | 11/2022 | Van Rotterdam et al. |

OTHER PUBLICATIONS

Notice of Allowance for U.S. Appl. No. 17/863,617, mailed Sep. 4, 2024, 3 pgs.

Notice of Allowance for U.S. Appl. No. 17/863,617, mailed Jul. 31, 2024, 5 pgs.

Office Action for U.S. Appl. No. 17/863,617, mailed Feb. 23, 2024, 10 pgs.

* cited by examiner

600

| Hash tag | Action |
| --- | --- |
| #doc.view:document1 | Open "document1" in view pane of UI |
| #doc.view | View document in the current context |
| #doc.checkout:document1 | Check out and open "document1" |
| #doc.checkout | Check out and open document in the current context |
| #workflow.start:workflow1 | Start "workflow1" and show current state |
| #user.delete:user1 | Show confirmation dialog to delete "user1" |
| #search:abc | Perform query "abc" and show results in search result pane |

FIG. 6

ACTIVITY STREAM BASED COLLABORATION

CROSS-REFERENCE TO RELATED APPLICATIONS

This application is a continuation of, and claims a benefit of priority under 35 U.S.C. 120 of the filing date of U.S. patent application Ser. No. 17/574,934, filed Jan. 13, 2022, issued as U.S. Pat. No. 11,641,317, entitled "ACTIVITY STREAM BASED COLLABORATION," which is a continuation of, and claims a benefit of priority under 35 U.S.C. 120 of the filing date of U.S. patent application Ser. No. 16/572,285, filed Sep. 16, 2019, issued as U.S. Pat. No. 11,252,069, entitled ACTIVITY STREAM BASED COLLABORATION," which is a continuation of and claims a benefit of priority under 35 U.S.C. 120 of the filing date of U.S. patent application Ser. No. 15/913,587 filed Mar. 6, 2018, issued as U.S. Pat. No. 10,447,568, entitled "ACTIVITY STREAM BASED COLLABORATION," which is a continuation of and claims a benefit of priority under 35 U.S.C. 120 of the filing date of U.S. patent application Ser. No. 15/610,019, filed May 31, 2017, issued as U.S. Pat. No. 9,935,860, entitled "ACTIVITY STREAM BASED COLLABORATION," which is a continuation of and claims a benefit of priority under 35 U.S.C. 120 of the filing date of U.S. patent application Ser. No. 13/529,286, filed Jun. 21, 2012, issued as U.S. Pat. No. 9,692,675, entitled "ACTIVITY STREAM BASED COLLABORATION," all of which are incorporated herein by reference for all purposes.

BACKGROUND OF THE INVENTION

In social collaboration tools, activity streams enable participants to exchange information quickly via lightweight communications in real time. Social collaboration tools have become more and more important to both non-enterprise and enterprise users, and increasingly have been used within and among enterprises to facilitate collaboration among users. In some solutions, end users collaborate and track activities by typing and/or reading short messages in an activity stream widget component of an enterprise or other application user interface.

Typically, social collaboration tools enable short text-based messages to be shared in real time via the activity stream, enabling messages entered by a sending user to be read in real time by receiving users, for example. Other collaboration tools, such as WebEx™, include the ability to allow a remote user to view or take control over a target user's computer, e.g., their "desktop", and all applications running and/or available to be run on it.

BRIEF DESCRIPTION OF THE DRAWINGS

Various embodiments of the invention are disclosed in the following detailed description and the accompanying drawings.

FIG. 6 is a block diagram illustrating an embodiment of a lookup table of application-level actions corresponding to certain control tags.

DETAILED DESCRIPTION

Figure 1:
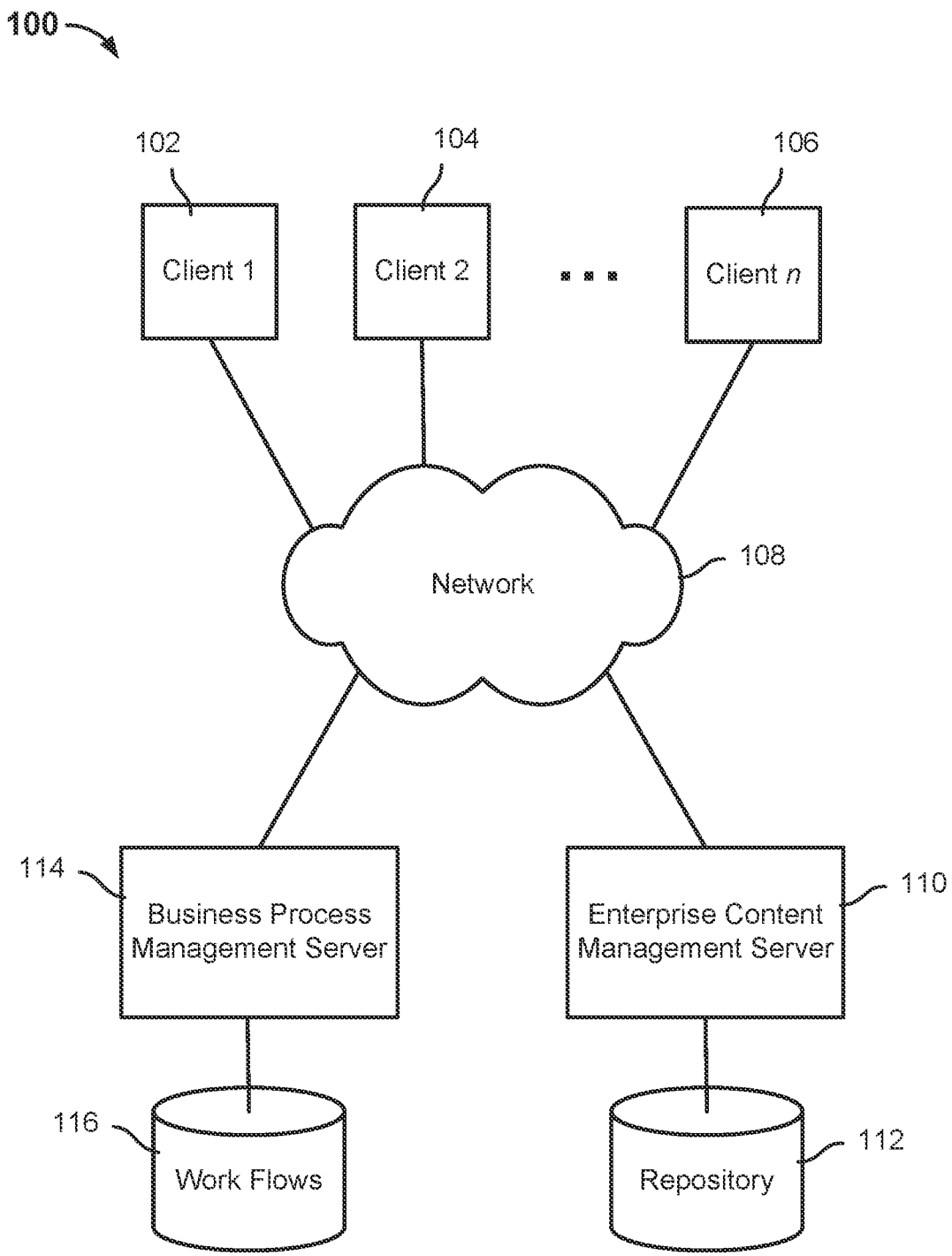
FIG. 1 is a block diagram illustrating an example of a network environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An interaction model and supporting technologies to enable a remote user to exercise a degree of control over an application at a target system, via text-based or other control tags typed or otherwise entered into an activity stream by the remote user at the remote user's system, are disclosed. In various embodiments, the remote user enters into an activity stream a predefined hash tag that the target system is configured to recognize and respond to by performing an associated application-level action. For example, in some embodiments, an enterprise content management user interface application at the target system is configured to recognize in an activity stream a hash (or other) tag such as "#doc.view:document1" and to respond to the tag by performing (or initiating) an operation to retrieve "document1" from a shared repository and display same in a viewer widget (or other application-associated display element) at the target system, as described more fully below. In some embodiments, non-human users, such as backend servers, may be configured to recognize and respond to hash tags inserted in an activity stream and/or to insert such tags into an activity stream, for example to send notifications and/or to prompt human or other participants in the activity stream to perform associated actions.

In various embodiments, a user of the system that receives the activity stream has the ability to control, e.g., through configuration settings, responses to dialogs, etc., the degree to which control of the client interface is ceded to the remote system/user. For example, in some embodiments, a hash (or other) tag may be used to provide the ability for content identified in the tag, or determined automatically from an applicable content, such as a document, to be retrieved automatically from a repository and displayed in a viewer or other window or portion of a user interface at the client, and in some such embodiments the user at the receiving system is prompted to indicate whether the user wants the system to respond to the tag by retrieving and displaying the document.

FIG. 1 is a block diagram illustrating an example of a network environment. In the example shown, an enterprise (or other) network environment 100 includes a plurality of client systems 1 to n, represented in FIG. 1 by clients 102, 104, and 106. Examples of client systems include desktop and/or laptop computers, tablet computers, smart phones and/or other mobile devices, etc. Clients represented by clients 102, 104, and 106 connected via network 108 to one another and to one or more servers. In the example shown, an enterprise content management server 110 provides access to managed content, e.g., files and/or other objects, stored in a shared repository 112. A business process management server 114 manages business processes, such as work flows, on behalf of enterprise users, using work flow definitions and/or state information stored in data store 116.

In various embodiments, clients such as clients 102, 104, and 106 have installed enterprise content management client software, JavaScript or other browser-executed code, and/or other client side software configured to facilitate collaboration using control tags inserted by users into an activity or other communication stream system to other collaboration participants. In various embodiments, participants may include one or both of human users of client systems such as clients 102, 104, and 106, and backend processes and/or servers such as enterprise content management server 110 and business process management server 114. In various embodiments, a participant injects a hash tag or other control tag into an activity stream, for example by entering the tag in a text entry field of an activity stream interface. At a target system that receives the activity stream, the presence of the hash tag in the activity stream is detected and an application level operation is performed in response. For example, in one use of techniques disclosed herein, a user may include in an activity stream a hash tag to cause a document or other content to be retrieved from a shared repository, such as repository 112, and displayed (or offered for display) automatically at the receiving system. In some embodiments, components of an enterprise content management client user interface software recognize and act in response to presence of the hash tag in the activity stream.

Figure 2:
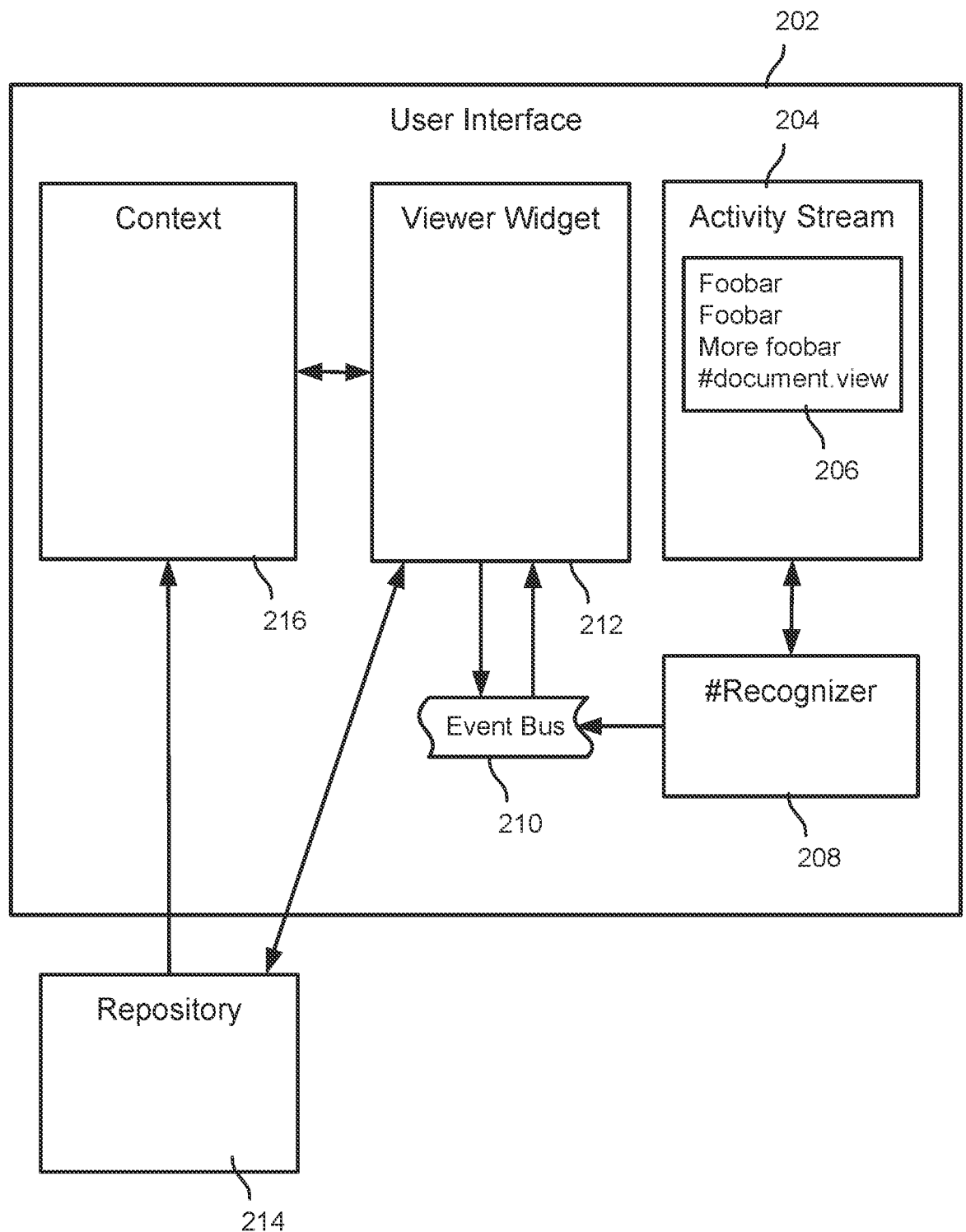
FIG. 2 is a block diagram illustrating an embodiment of a user interface configured to recognize and respond to control tags in a received activity stream.

FIG. 2 is a block diagram illustrating an embodiment of a user interface configured to recognize and respond to control tags in a received activity stream. In the example shown, an enterprise content management client user interface 202 includes an activity stream component 204 configured to display text-based messages entered by remote and/or local users participating in an activity stream-facilitated collaboration. In the example shown, text entered by remote users or the local user are displayed in time order in a display field 206. A message entry field (not shown) enables the local user to participate in the conversation. In the example shown, three lines of message text have been communicated followed by a hash tag, "#document.view". A hash tag recognizer 208 included in and/or associated with user interface 202 recognizes the presence of the hash tag "#document.view" in the activity stream, and broadcasts on enterprise content management (ECM) event bus 210 an event that notifies other elements that the hash tag has been detected. In response, viewer widget 212 retrieves from repository 214 and displays in a window associated with viewer widget 212 a document or other object determined to be relevant based on ECM context 216. The ECM context may include, without limitation, an application context with which content stored in an ECM system and/or other repository is associated. For example, in a collaboration session regarding a legal contract or other document, the document that is the subject of the collaboration and/or a current phase thereof may be retrieved. In various embodiments, other hash tags and/or additional information may be included and/or used to specify by object or other name a specific document or other object to be retrieved and displayed. In various embodiments, by including a hash or other control tag in the activity stream as disclosed herein, a remote user can control the behavior and operation of a specific application at a target system, in this example the ECM client user interface 202.

In some embodiments, a local user of user interface 202 is provided with a mechanism to configure the behavior of user interface 202 with respect to control tags as described herein. For example, a user may be provided with an ability to determine whether content indicated in control tags is retrieved and displayed automatically, or instead only after the user has indicated the user desires that behavior in a particular instance, for example by choosing an option in a dialog box or other control displayed upon receipt and recognition of a content retrieval control tag.

Figure 3:
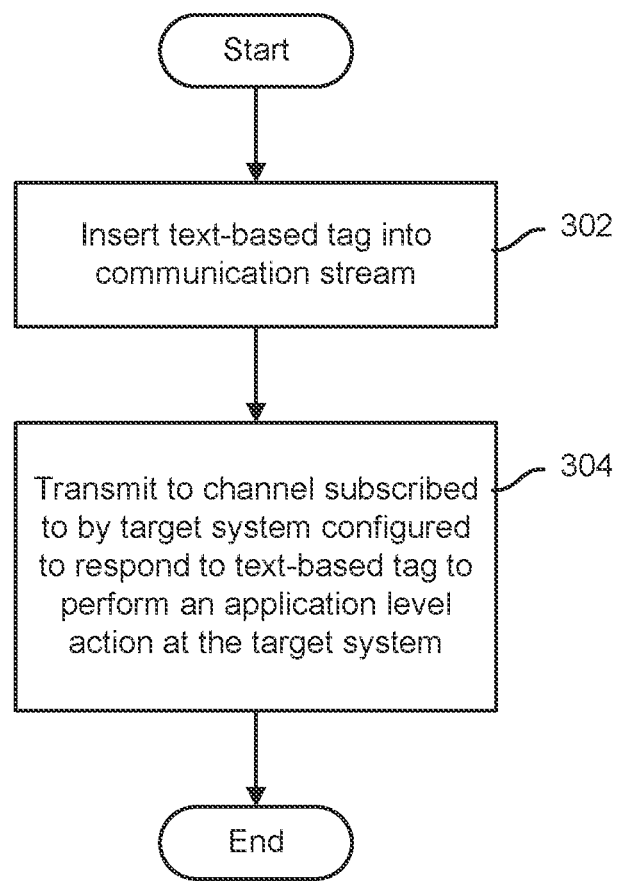
FIG. 3 is a flow diagram illustrating an embodiment of a process to exert application-level control at a remote system.

FIG. 3 is a flow diagram illustrating an embodiment of a process to exert application-level control at a remote system. In the example shown, a human or machine user inserts in this example a text-based tag, such as a hash tag as described above, into an activity stream or other communication stream (302). The stream, including the control tag, is transmitted via a communication service, such as an activity stream, to which the target system is subscribed or otherwise a participant (304). The target system is configured, for example by the running of ECM or other client user interface software as in the example of FIG. 2, to recognize the control tag in the activity stream or other communication stream and to respond thereto by performing an application level action associated with the tag, as described herein.

Figure 4:
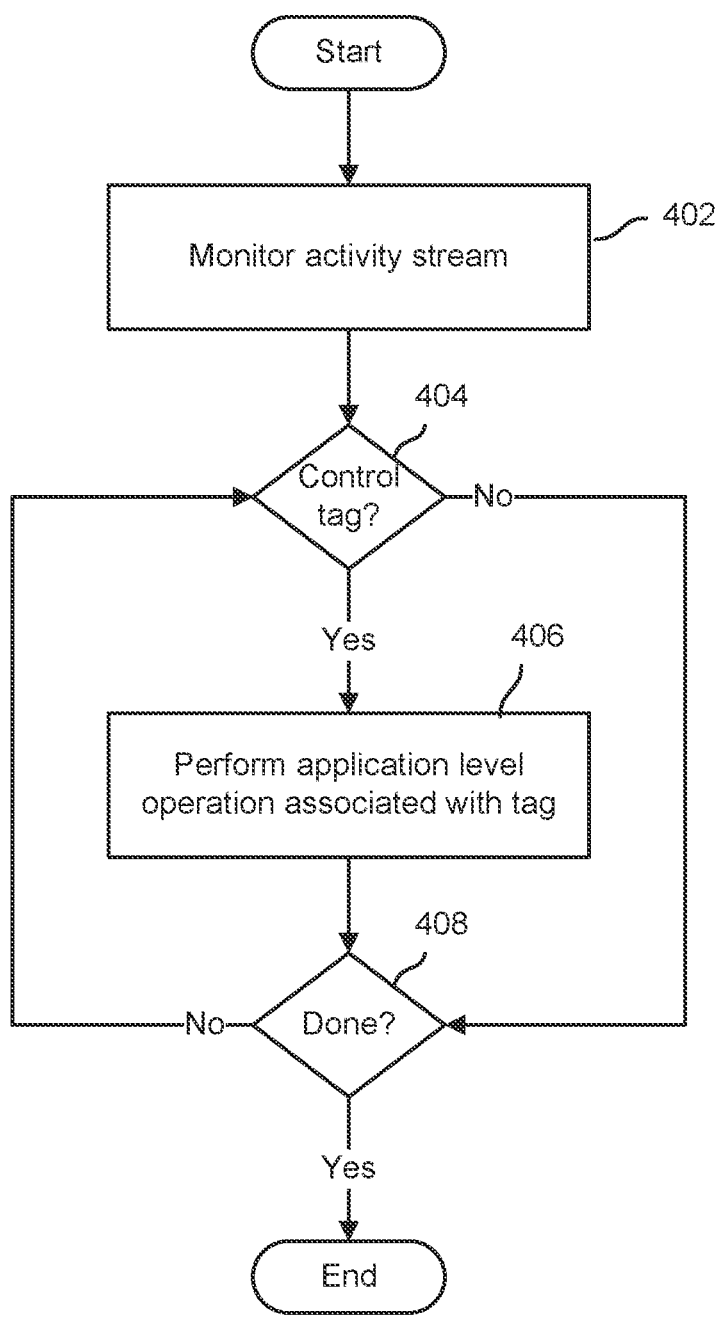
FIG. 4 is a flow diagram illustrating an embodiment of a process to recognize and respond to control tags in a received activity stream.

FIG. 4 is a flow diagram illustrating an embodiment of a process to recognize and respond to control tags in a received activity stream. In the example shown, a receiving system, such as a client running an ECM client user interface as in the example of FIG. 2, monitors an activity stream (402). Upon recognizing the presence of a hash tag or other control tag in the stream (404), an application level operation associated with the tag, e.g., retrieving and displaying a document as in the example described above, is performed (406). The process continues until the activity stream is no longer active and/or being monitored (408).

Figure 5:
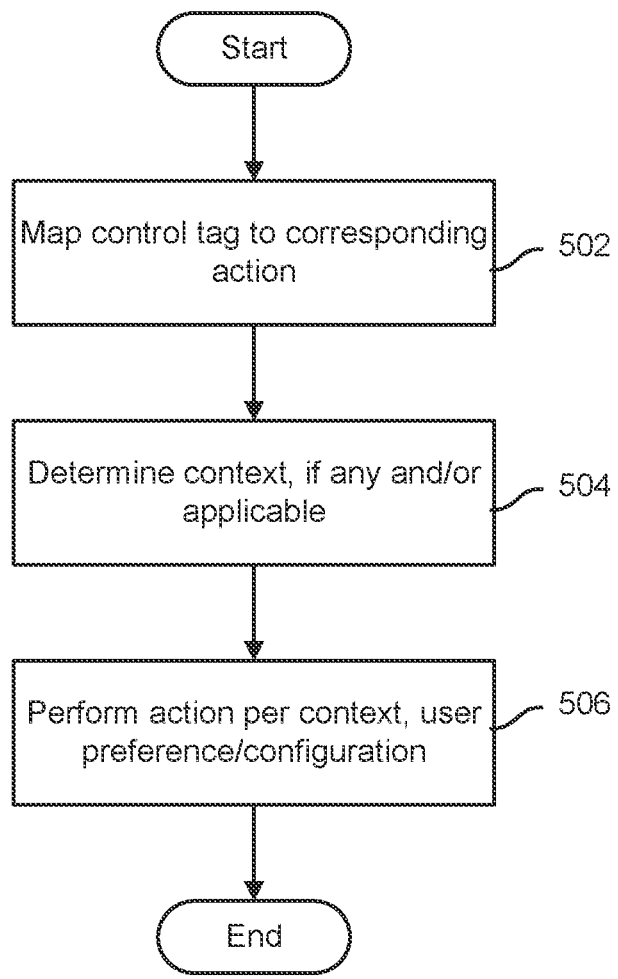
FIG. 5 is a flow diagram illustrating an embodiment of a process to respond to control tags in a received activity stream.

FIG. 5 is a flow diagram illustrating an embodiment of a process to respond to control tags in a received activity stream. In various embodiments, the process of FIG. 5 is used to implement 406 of FIG. 4. In the example shown, a received control tag is mapped to a corresponding action (502). For example, in the example described in connection with FIG. 2, the hash tag "#doc.view" would have been mapped to an operation to retrieve and display a document as determined by a current ECM client user interface context. The applicable context, if any for this operation, is determined (504). The action is performed, in light of the context, if applicable, and in various embodiments in a manner consistent with configured user preferences, if any (506). For example, in some embodiments a user may control whether the user may be interrupted by actions initiated by others remotely by including a hash tag or other control tag in an activity stream.

Note that in the case of an activity stream monitored by a plurality of users, human or otherwise, recipients of the stream each may be configured to respond, potentially in its own way, to a received hash tag or other control tag. For example, each of a plurality of users may receive a control tag, and their respective systems may in response retrieve and display the same content object as indicated by the control tag included in the activity stream.

FIG. 6 is a block diagram illustrating an embodiment of a lookup table of application-level actions corresponding to certain control tags. In the example shown, a lookup table 600 stores a plurality of hash tags (left column) and for each a corresponding action (right column). In the example shown, the hash tag "#doc.view:document1" causes the specified object "document1" to be retrieved and displayed in a view pane, for example of an ECM client user interface, whereas the hash tag "#doc.view" received alone, without specifying an object, causes a document determined by an applicable application context to be retrieved. Similarly, the tag "#doc.checkout:document1" causes "document1" to be checked out from the repository, while the tag "#doc.checkout" alone causes a document indicated by a current ECM client context to be checked out. The tag "#workflow.start:workflow1" in this example causes an instance of "workflow1" to be created and started. In some embodiments, a server such as business process management (BPM) server 114 of FIG. 1 may be configured to participate in an activity stream, including by recognizing and taking action in response to hash tags included therein, e.g., starting an indicated workflow, as described above. In this example, an administrative task to delete a user may be caused to be performed by an authorized human or machine user inserting into the activity stream the hash tag "#user.delete:user1", specifying the user to be deleted. Finally, in this example the tag "#search:abc" causes search results for the query "abc", for example against a body of content stored in a shared repository, to be retrieved and displayed at the recipient system. While a lookup table is shown in FIG. 6, in various embodiments, other implementations are used to associate actions with hash tags.

Figure 7:
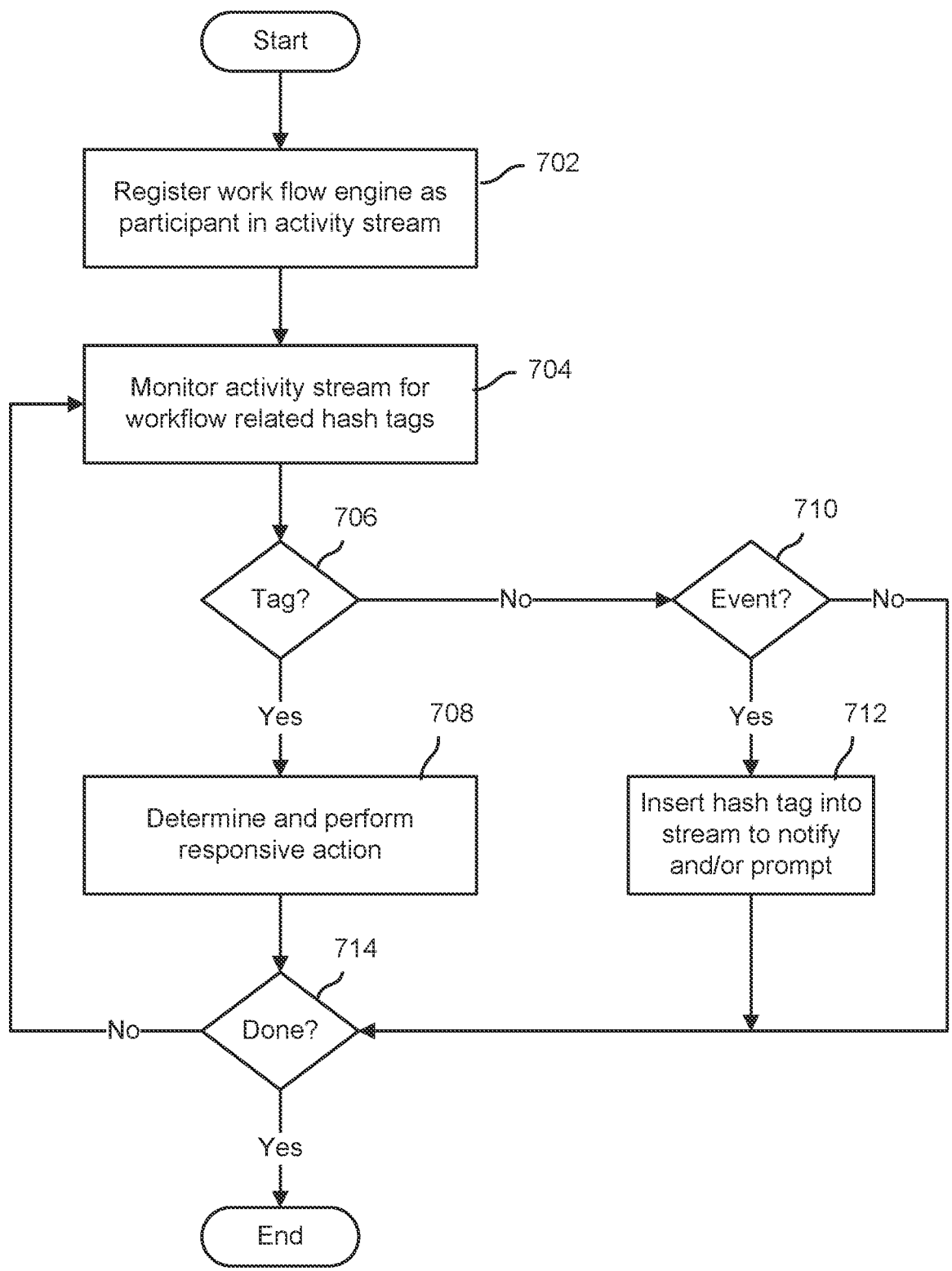
FIG. 7 is a flow diagram illustrating an embodiment of a process to insert into an activity stream as appropriate, and to recognize and respond appropriately to control tags included in an activity stream.

FIG. 7 is a flow diagram illustrating an embodiment of a process to insert into an activity stream as appropriate, and to recognize and respond appropriately to control tags included in an activity stream. In some embodiments, the process of FIG. 7 is implemented on a backend server or other system, for example by a BPM server as shown in FIG. 1. In the example shown, a work flow engine in this example registers itself (or is registered by an administrator) as a participant in an activity stream (702). For example, the engine subscribes to or becomes a follower or other listener to the stream. The stream is monitored, including to recognize any workflow related hash tags that may be included therein (704). If a hash tag the workflow engine is configured to respond to is found to be present (706), the associated action is determined and performed (708). For example, receipt of the tag "#workflow.start:workflow1" in the example above may cause an instance of the workflow indicated to be started. If an event associated with a currently executing workflow occurs that requires action by the workflow engine, and the action includes inserting one or more hash tags into an activity stream with which the workflow is associated (710), then the appropriate hash tag is determined, generated, and inserted into the activity stream (712). Examples include, without limitation, hash tag to which receiving application software on the recipient systems (e.g., ECM client user interface software, in the examples described above) may be configured to respond by performing such actions as displaying a notice, prompting a local user to perform a review or provide other input, causing content the recipient user is supposed to review, approve, edit, etc. to be retrieved, checked out, and/or displayed, etc. The process continues until participation in the activity stream ends (714), for example the work flow is completed, the BPM server is taken out of service for maintenance, etc.

Figure 8:
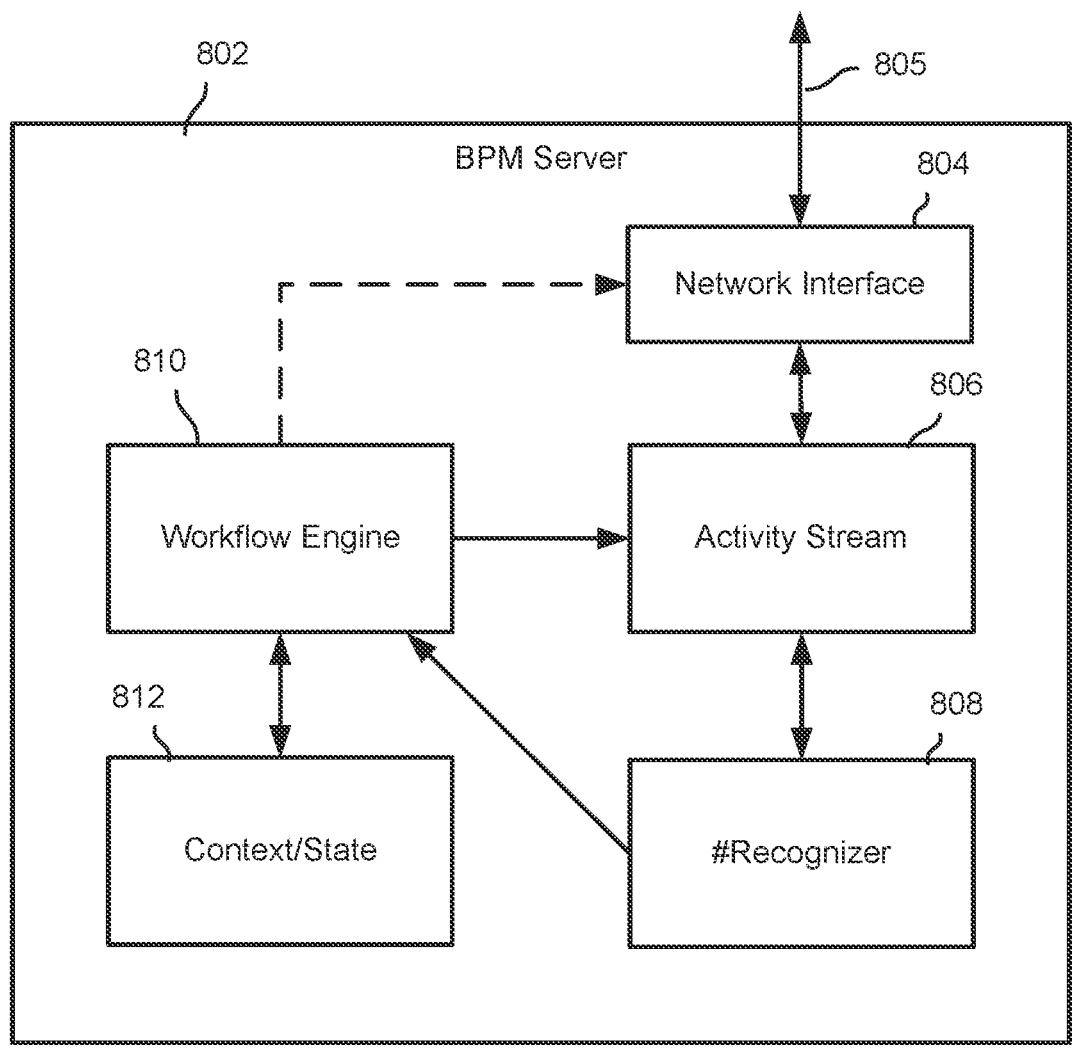
FIG. 8 is a block diagram illustrating an embodiment of a backend server configured to participate in an activity stream.

FIG. 8 is a block diagram illustrating an embodiment of a backend server configured to participate in an activity stream. In the example shown, BPM server 802 includes a network interface 804 configured to send and receive network communications via a connection 805. Communications comprising an activity stream are sent and received by activity stream module 806. In the case of a purely machine user, the activity stream communications may or may not be displayed. A hash tag recognizer 808 monitors the activity stream and is configured to recognize the presence therein of hash tags, and in the case of hash tags to which the workflow engine 810 is required to respond, to determine the required action and cause the action to be performed. The workflow engine responds to received hash tags to which it is required to respond, based as applicable on workflow state information 812. Examples include without limitation responding to hash tags to start a workflow, report progress with respect to a workflow, transition a workflow to a next state, notify participants in the workflow that a next state has been entered and/or specified actions are required of them, etc. As in FIG. 7, in some embodiments, the workflow engine 810 is configured to insert into the activity stream via module 806 one or more hash tags to communicate with other participants and in applicable cases to exercise control over an application at a remote recipients system, for example by causing a document or other object to be retrieved and displayed at the remote system, as described above.

Using techniques disclosed herein, a human or machine participant in a collaboration is able to control an application running at a remote system, without providing complete access to and/or control over the remote system. In this way, a potentially useful degree of control may be provided without the security concerns that might be present if more complete control over the target system were provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a communication interface; and
a processor coupled to the communication interface and configured to:

monitor an activity stream comprising communication messages received via the communication interface, the communication messages between and amongst a plurality of users collaborating in a workflow;

detect a workflow tag in one of the communication messages, the workflow tag comprising a reference to the workflow and a workflow application-level command associated with an operation to be performed in response to the application-level command;

in response to detecting the workflow tag, identifying the workflow and performing the operation associated with the workflow application-level command;

detect an event associated with a currently executing workflow;

in response to detecting the event associated with the currently executing workflow, insert a tag associated with the detected event into the activity stream; and wherein the workflow tag is generated by one of the collaborating users issuing a command corresponding to the workflow.

2. The system of claim 1, wherein in response to the collaborating user issuing the command, inserting the workflow tag into the activity stream.

3. The system of claim 1, wherein
in response to detecting the event, notify or prompt one or more of the users.

4. The system of claim 1, wherein the workflow tag corresponds to a workflow table, the workflow table comprising an action associated with the workflow command.

5. The system of claim 1, wherein the workflow tag comprises an object identifier, the object identifier identifying one of: a specified document, a specified user or a specified command.

6. The system of claim 5, wherein the object identifier identifies a specified user and performing the workflow command comprises:
adding the specified user to the plurality of users collaborating in the workflow or deleting the specified user from the plurality of users collaborating in the workflow.

7. The system of claim 5, wherein the object identifier identifies a specified document and performing the workflow command comprises:
performing an action on the specified document.

8. The system of claim 5, wherein the object identifier identifies a specified command and performing the workflow command comprises:
performing the specified command.

9. A method, comprising:
monitoring an activity stream comprising communication messages received via a communication interface executing on a processor, the communication messages between and amongst a plurality of users collaborating in a workflow;

detecting a workflow tag in one of the communication messages, the workflow tag comprising a reference to the workflow and a workflow application-level command associated with an operation to be performed in response to the application-level command;

in response to detecting the workflow tag, identifying the workflow and performing the operation associated with the workflow application-level command;

detecting an event associated with a currently executing workflow;

in response to detecting the event associated with the currently executing workflow, insert a tag associated with the detected event into the activity stream; and wherein the workflow tag is generated by one of the collaborating users issuing a command corresponding to the workflow.

10. The method of claim 9, further comprising, in response to the collaborating user issuing the command, inserting the workflow tag into the activity stream.

11. The method of claim 9, wherein
in response to detecting the event, notifying or prompting one or more of the users.

12. The method of claim 9, wherein the workflow tag corresponds to a workflow table, the workflow table comprising an action associated with the workflow command.

13. The method of claim 9, wherein the workflow tag comprises an object identifier, the object identifier identifying one of: a specified document, a specified user or a specified command.

14. The method of claim 12, wherein the object identifier identifies a specified user and performing the workflow command comprises:
adding the specified user to the plurality of users collaborating in the workflow or deleting the specified user from the plurality of users collaborating in the workflow.

15. The method of claim 12, wherein the object identifier identifies a specified document and performing the workflow command comprises:
performing an action on the specified document.

16. The method of claim 12, wherein the object identifier identifies a specified command and performing the workflow command comprises:
performing the specified command.

17. A computer program product comprising a non-transitory computer readable medium storing computer instructions executable to:
monitor an activity stream comprising communication messages received via a communication interface executing on a processor, the communication messages between and amongst a plurality of users collaborating in a workflow;

detect a workflow tag in one of the communication messages, the workflow tag comprising a reference to the workflow and a workflow application-level command associated with an operation to be performed in response to the application-level command;

in response to detecting the workflow tag, identify the workflow and performing the operation associated with the workflow application-level command;

detect an event associated with a currently executing workflow;

in response to detecting the event associated with the currently executing workflow, insert a tag associated with the detected event into the activity stream; and wherein the workflow tag is generated by one of the collaborating users issuing a command corresponding to the workflow.

18. The computer program product of claim 17, the computer instructions further executable to, in response to the collaborating user issuing the command, insert the workflow tag into the activity stream.

19. The computer program product of claim 17, wherein the workflow tag corresponds to a workflow table, the workflow table comprising an action associated with the workflow command.

20. The computer program product of claim 17, wherein the workflow tag comprises an object identifier, the object identifier identifying one of: a specified document, a specified user or a specified command.

* * * * *